C. P. BARY.
PUMPING APPARATUS FOR MOLTEN LEAD OR OTHER FUSIBLE SUBSTANCES.
APPLICATION FILED FEB. 12, 1913.
1,193,859.
Patented Aug. 8, 1916.
5 SHEETS—SHEET 1.
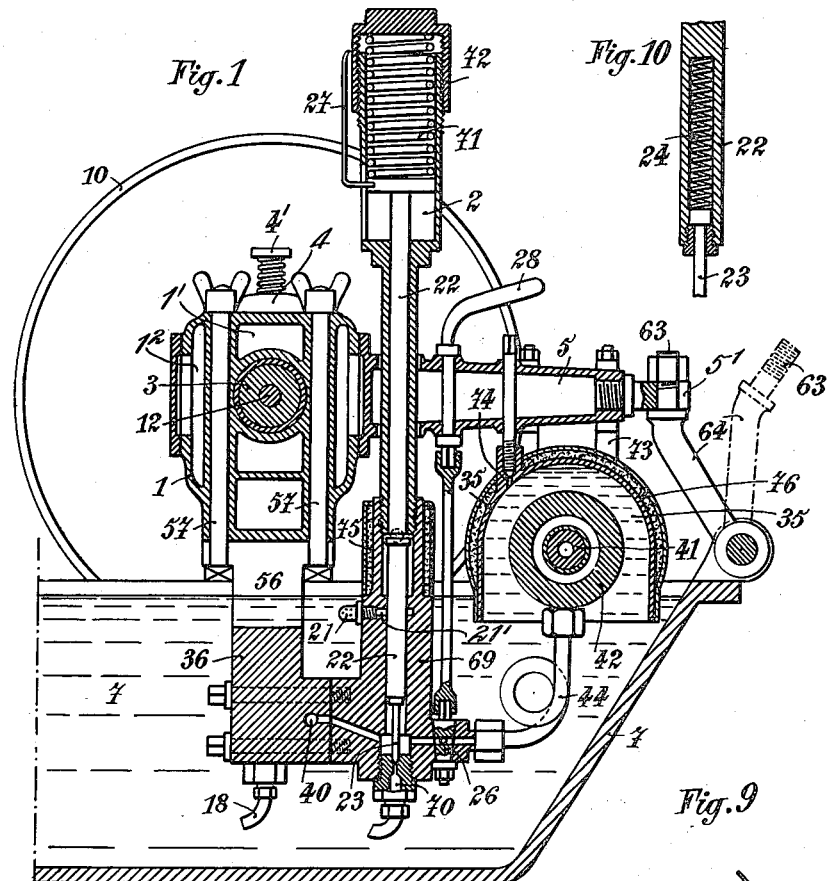
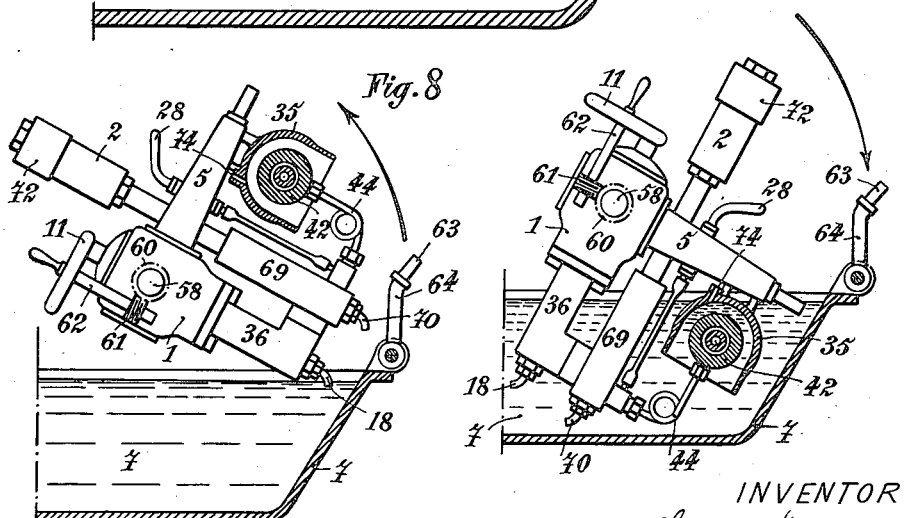
WITNESSES:
Fred White
René Bruine
INVENTOR:
Charles Paul Bary,
By Attorneys,
Fraser, Trask & Myers C. P. BARY.
PUMPING APPARATUS FOR MOLTEN LEAD OR OTHER FUSIBLE SUBSTANCES.
APPLICATION FILED FEB. 12, 1913.

1,193,859.

Patented Aug. 8, 1916.
5 SHEETS—SHEET 2.

WITNESSES:
Fred White
René Bruine

INVENTOR:
Charles Paul Bary,
By Attorneys,
Fraser, Smith and Myers

C. P. BARY.
PUMPING APPARATUS FOR MOLTEN LEAD OR OTHER FUSIBLE SUBSTANCES.
APPLICATION FILED FEB. 12, 1913.
1,193,859.
Patented Aug. 8, 1916.
5 SHEETS—SHEET 3.
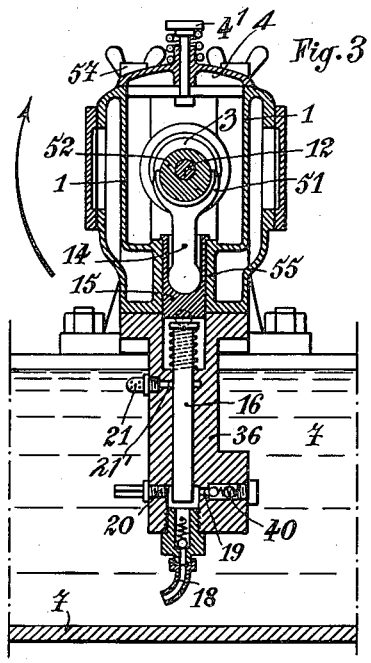
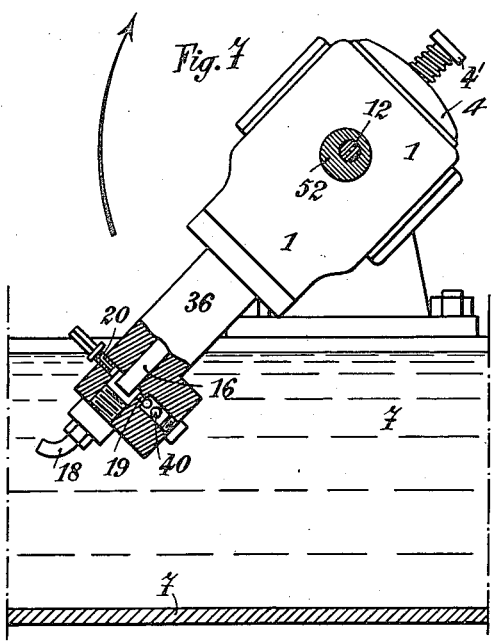
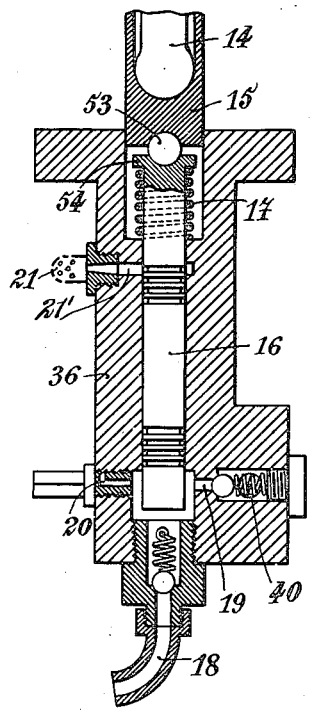
WITNESSES:
INVENTOR:
Charles Paul Bary,
By Attorneys,

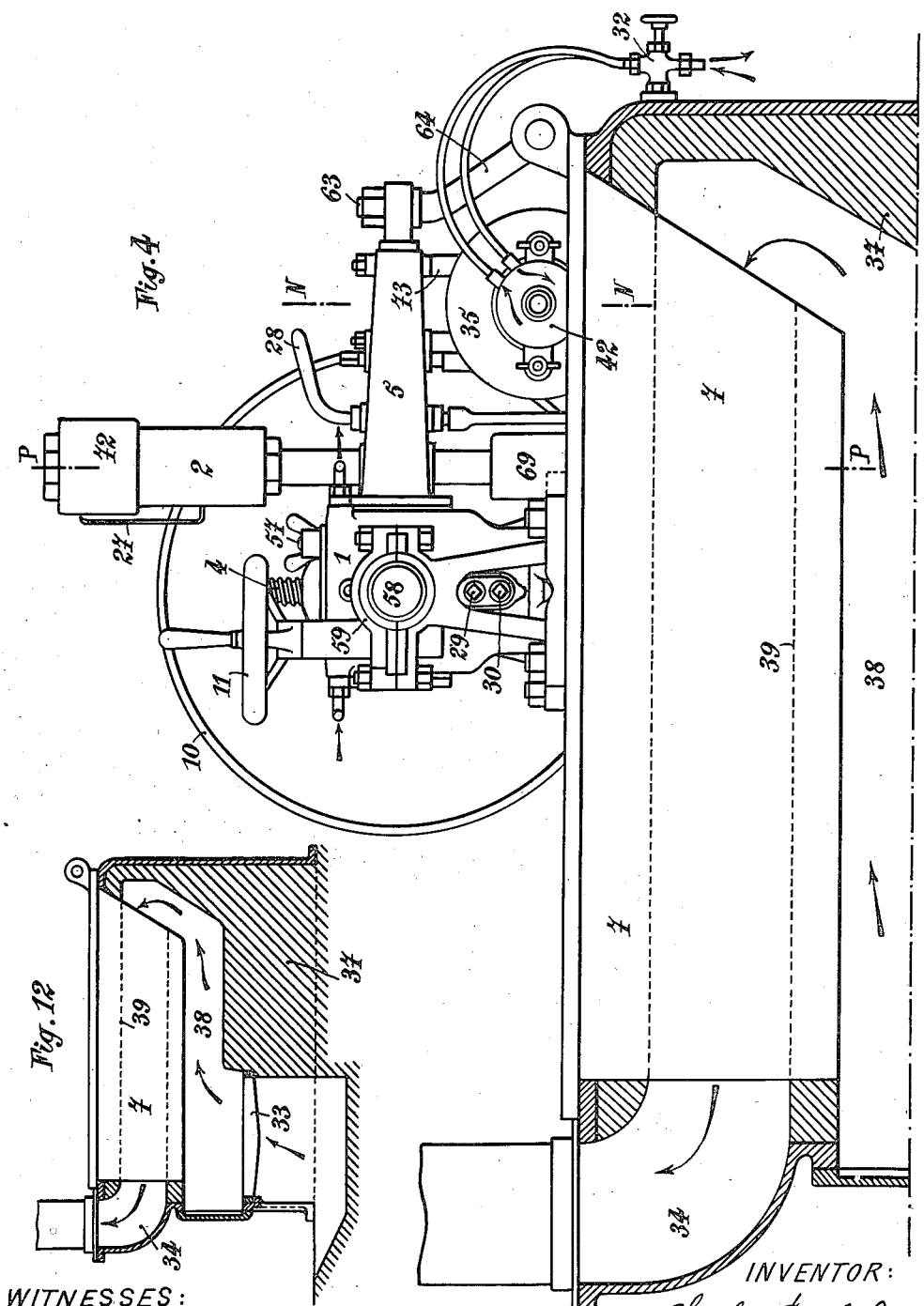

C. P. BARY.
PUMPING APPARATUS FOR MOLTEN LEAD OR OTHER FUSIBLE SUBSTANCES.
APPLICATION FILED FEB. 12, 1913.

1,193,859.

Patented Aug. 8, 1916.
5 SHEETS—SHEET 5.

WITNESSES:
Fred White
René Muine

INVENTOR:
Charles Paul Bary,
By Attorneys,
Fraser, Finch & Myers

UNITED STATES PATENT OFFICE.

CHARLES PAUL BARY, OF PARIS, FRANCE, ASSIGNOR TO HENRY PIERRE CHARLES GEORGES DEBAUGE, OF PARIS, FRANCE.

PUMPING APPARATUS FOR MOLTEN LEAD OR OTHER FUSIBLE SUBSTANCES.

1,193,859. Specification of Letters Patent. Patented Aug. 8, 1916.

Application filed February 12, 1913. Serial No. 747,866.

*To all whom it may concern:*

Be it known that I, CHARLES PAUL BARY, of Paris, France, engineer, have invented certain new and useful Improvements in Pumping Apparatus for Molten Lead or other Fusible Substances, of which the following is a specification.

This invention has for its object a pump for delivering under high pressure molten metals at high temperatures such as molten lead, or alloys or other metals or fusible substances with a view to the production of wires, tubes, cable casings, and so forth with the aid of a suitable die or forming device.

A pump such as is required for continuously forcing or extruding tubes of lead or wires, or casings, or coverings of this metal for cables, should work at a temperature of about 350° C. This condition is of itself sufficient to necessitate the employment of very special means, as the purely mechanical portion of the pump, where friction takes place under relatively heavy forces, can only operate properly at a much lower temperature.

The pump which forms the subject of the present invention is constructed or combined in such manner that the purely mechanical parts are exposed to the atmosphere, while those which effect the continuous forcing of the molten lead are immersed in the molten lead container and are thus kept at a suitable temperature. This independence of the two groups of parts of the pump from the point of view of their situation in regard to temperature, forms one of the distinctive features of this pump.

The other features of the invention will appear from the following description with reference to the accompanying drawings.

Figure 2:
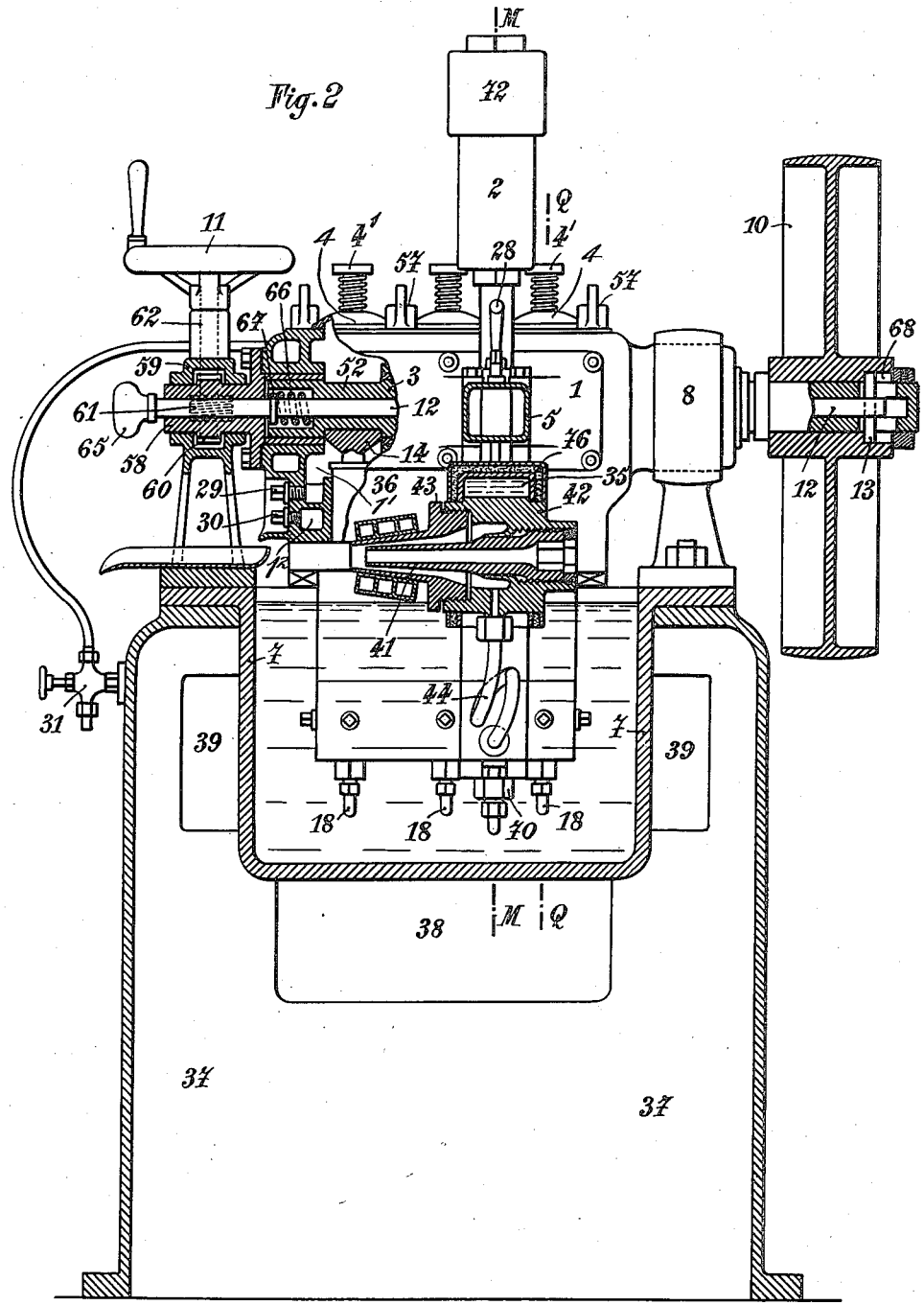
Figure 5:
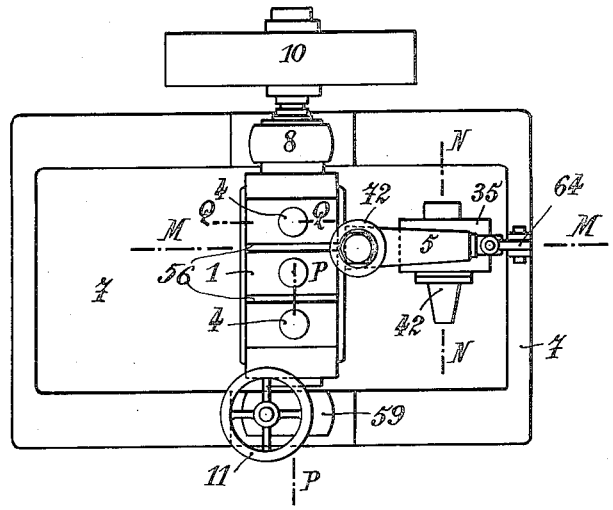
Figure 11:
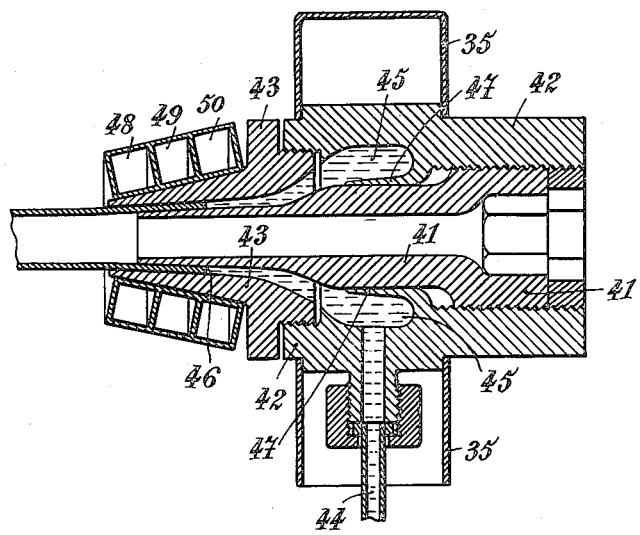

Figure 1 is a cross section of a pump constructed in accordance with the invention, the section being taken on line M M of Figs. 2 and 5. Fig. 2 shows two longitudinal sections, one on N N Figs. 4 and 5, and the other on P P of Figs. 4 and 5. Fig. 3 is a section on line Q Q of Figs. 2 and 5. Fig. 4 is a front elevation of the machine. Fig. 5 is a diagrammatic plan on a smaller scale to show the relative positions of the parts. Fig. 6 illustrates the pump piston and cylinder in enlarged sectional detail. Figs. 7 and 8 and 9 are views illustrating the apparatus in different positions with respect to the bath. Fig. 10 illustrates a detail of the parts 22 and 23, Fig. 1. Fig. 11 is a sectional view of the die or forming device. Fig. 12 is a vertical section, with parts in elevation, of a melting furnace in conjunction with the apparatus.

This machine may be divided into three distinct parts: 1. The operating mechanism which is located in the upper part of the machine and outside the bath of molten lead. 2. The pump proper, located below the operating mechanism and immersed in the molten lead. 3. The accessory apparatus or devices which are likewise immersed in the molten lead.

The operating mechanism comprises a shaft 3 supported at its ends in the casing 1. At one side,—the right hand of Fig. 2,— the casing is itself trunnioned in a plumber block 8; at the other side the casing is in rigid connection with a trunnion 58 rotating in a plumber block 59.

The plumber blocks 8 and 59 are supported on the edges of a fixed container 7 for the molten lead, into which container the pump extends. The shaft 3 actuates the pitmen 14 which operate the pistons 16 working in the cylinders 36, three of which are shown in the example but the number may vary (see Fig. 3, and Fig. 6 which shows a part of Fig. 3 on a larger scale). The result of employing a number of cylinders is to secure a continuous delivery under high pressure of the molten metal forced to the die, even if one of the pistons were momentarily stopped as will be explained later. Each pitman 14 is formed at its upper end with a fork 51 which embraces an eccentric 52 cut in the shaft 3. The lower end of the pitman 14 extends as a spherical thrust end into a false piston 15 serving as a slide and hereinafter called the slide piston. Each of the pitmen is therefore not jointed or connected to the shaft or eccentric at top, and it only acts by thrust on its piston 16 to force the latter down. This piston is raised as hereinafter explained.

The slide piston 15 carries at its lower end a spherical steel ball 53 (see Fig. 6) which rests above the piston 16 and serves as an intermediary between the piston and the piston slide when the pitman 14 descends. When the pitman is not forced downward by its eccentric 52 it is raised by a spring 17 coiled around the upper part of the piston 16 and acting below a collar 54. The raising of the piston is therefore effected by the action of the spring, and the pitman 14 remains in contact with the crank shaft 3 if there is no obstacle to the normal operation of the piston. The arrangement just described has the advantage of permitting of a certain play between the slide-piston 15 and the pitman 14 on the one hand, and between this same slide-piston and the piston proper 16 on the other hand, the consequence of which is to prevent jamming in the two cylinders 36 and 55 which guide the pistons 16 and 15. If foreign matter should have become introduced with the lead between the piston 16 and its cylinder 36, this cannot cause jamming of the machine, because the spring 17 not being sufficiently strong to raise the piston 16 whose operation is obstructed, the crank shaft 3 can continue to rotate without actuating the pitman of the piston which is held fixed.

The cylinders 36 of the pump are made in a single block of steel, the upper part of which presents two hollows 56 between the cylinders (see Figs. 1 and 5) to allow of the passage of the molten metal between the upper parts of the cylinders so that these latter are likewise heated all around thus avoiding unequal expansion and axial distortion of the cylinders, which thus remain quite parallel.

The operating mechanism of the pump is surrounded by a casing 1 closed by caps or covers 4 fixed by spring fitted bolts 4', Figs. 1, 2 and 3 and having an oil compartment 1' and a water jacket 1². The compartment 1' is filled with oil which can be withdrawn through an emptying orifice closed by a screw plug 29. This casing has likewise a water circulation through the jacket 1² which contributes to maintaining the operating mechanism at a suitable temperature. The said water jacket is supplied by the pipe 31 fitted with a cock, and the water leaves the jacket by a similar cock. The water can be run out of the jacket by an opening closed by a screw plug 30. The function of the oil jacket is to lubricate the parts and also to contain the oil and conduct heat. Oil or grease having a high melting point can be used. The oil or grease having mobility under the conditions in which used, has the property of heating by convection as well as by conduction. This facilitates the cooling of localized points; the oil jacket being in heat communication with the water jacket, the oil readily exchanges heat with the water.

The casing 1 is secured to the block in which the cylinders 36 are formed, by means of long bolts 57 having butterfly nuts which permit of being tightened up by hand and lend themselves if required to slight displacement of the assembled parts under the effect of expansion.

Each of the three cylinders has an orifice at its lower part to which is fitted a suction inlet 18 (Figs. 1, 2 and 3) fitted with a spring valve and which is bent so that the lower end will remain immersed in the molten lead when the apparatus is tilted as shown in the Fig. 8 and explained later.

19 is a delivery orifice likewise provided with a spring valve, the three delivering orifices of the pump being connected together by a common pipe 40. The third orifice 20 serves for the evacuation of the air in starting the pump, to facilitate priming.

For starting the pump it is desirable to tilt the same around the shaft 3, which is effected as follows:—The trunnion 58 rigidly united to the casing 1 carries a worm wheel 60 with which gears a worm 61 carried by a vertical shaft 62 terminating in a hand wheel 11 which can be turned in either direction. The casing is held in its normal position shown in Fig. 1, by means of a horizontal cast iron arm 5, carried by the casing and the forked end 5' of which bears on the flange or shoulder of a pin 63 forming the end of a pivoting stop arm 64. When it is desired to tilt the pump, the nut of the pin 63 is unscrewed to free the arm 5 and the hand wheel 11 is then operated. The shaft 3 is driven by the pulley 10 connected by a belt to any suitable transmission. The pulley 10 is connected to the shaft 3 by a clutch formed (see Fig. 2) by a rod 12 terminating at one end in an operating knob 65 and carrying at the other end a key 13 which can engage in two grooves formed in the boss of the pulley 10 to clutch this to the shaft 3, which is the normal position, this position being insured by a coiled spring 66 fitted around the rod 12 behind a collar 67 thereof. This spring is fitted in an opening or recess formed in the end of the shaft 3.

It will be understood from the above explanations that the shaft 3 is hollow to receive the axial clutch rod 12 and to allow the key 13 to come out of the grooves formed in the boss of the pulley and to enter the circular recess 68 of the said boss, thus rendering the pulley 10 independent of the shaft 3.

When the pump is made to tilt around the shaft 3 by operating the hand wheel 11, the shaft 3 should turn along with the casing 1 in order that the pistons 16 may remain stationary in their respective cylinders. The pulley 10 is then unclutched and remains stationary (being at rest) with its belt, so that the crank shaft 3 can be freely turned concurrently with the casing 1.

As above indicated, prior to starting the pump it should be tilted in the direction of the arrow shown in Fig. 3 and as seen in Fig. 7, so that the orifice 20 comes to the level of the molten lead. When the pistons come in turn to the bottom of their stroke under the action of the shaft 3 which is turned slowly by hand, they expel through the orifices 20 the air contained in the cylinders, the plugs that close the orifices 20 are then screwed home successively and the pump is tilted back to the upright position and can then be set in operation.

On the lower part of the block in which the cylinders are formed, there is fixed, by four bolts, a part which serves the triple purpose of a pressure regulator, a safety valve and a pressure gage. This part is formed as a cylinder 69 (Fig. 1) in which can move a long rod 22 seen in detail in section Fig. 10 at a larger scale. The rod 22 is hollow at its lower end and contains a coiled spring 24 which presses upon a rod 23, which rod 23 forms an obturator for an orifice in the plug 70 which communicates with the exterior of the pump in the molten lead container. The top of the rod 22 projects into a cage 2 containing a strong coiled spring 71 or a pile of Belleville washers, which can be compressed to a greater or less extent by means of the screw plug fitted in the top of the cage, so as to regulate the pressure limit which causes the obturator 23 to act. The rod 22 may be formed in two parts, with a ball between them, similar to the construction of the pistons, as shown in Fig. 1. This plug carries a vertical scale or graduation, and a pointer 27 fixed to the rod 22 allows of reading on the scale the tension of the spring and consequently the pressure limit in atmospheres.

The lead under pressure which is forced out of the cylinders 36 through the valves 19 unites in the collector 40 which communicates with the lower part of the cylinder 69 above described, and it then passes through a three-way cock 26 operated by a handle 28 and allowing either of regulating the amount delivered or of putting the lower chamber of the cylinder 69 rapidly into communication with the molten lead in the container. On issuing from this cock 26 the lead passes to the die 42 described later.

It should be observed that although the pump pistons and the rod 22 forming a hollow piston of the safety valve are well made and fitted, it is impossible to prevent all leakage. It is therefore necessary to provide for normal outlets of this lead to the exterior, so that it shall not solidify in the upper cool parts of the pump where it might prevent the movement of the parts. For this purpose the cylinders are provided with purge devices comprising grooves 21′ in the cylinder having an outlet through the cylinder. The outlets are fitted with perforated caps or strainers and which are marked 21 on the cylinders 36 of the pump and 25 on the cylinder 69 of the pressure regulator.

In order to see how all the parts are operating, and to ascertain whether leakages are occurring at any points, it is moreover of advantage to be able to move the pump out of the bath of lead for some time while still allowing it to operate; for this purpose it is tilted to bring it into the positions shown in Fig. 8, as has been above explained.

The Fig. 11 shows separately in section the die to which is connected the pipe 44 through which the molten lead is forced. This die is formed of three main concentric parts 41, 42 and 43. The part 41 is the inner portion of the die, and screws more or less forward,—according to the regulation obtained,—in the concentric part 42 on which is likewise screwed the nozzle 43 which forms the outer part of the die. The part 42 receives the fluid lead under pressure by the tube 44 and comprises a chamber 45 kept at constant temperature; a bath of molten lead contained in a belt 35 surrounding it. In order to prevent the molten lead under pressure, and which is very fluid, from leaking through the screw joint between 41 and 42, the central part of 42 has been given a special form comprising a tubular portion 47 which slides with slight friction on the inner die during the mounting of this latter. The part 47 is of sufficiently thin metal to be forced into tight contact with the part 41 so that when pressure is exerted against the part 47, an hermetic closure is effected, the part 47 being slightly elastic and behaving like the cup leather of hydraulic presses, that is to say forming a tighter joint the more the pressure, and consequent probability of leakage, increases. The molten lead therefore arrives between the parts 41 and 43 of the outlet nozzle, and a distribution of water cools the end of this nozzle and solidifies the lead before this issues from the die. The circumference 46 of solidification of the lead should occupy a well defined position for the result to be satisfactory. If the solidification takes place very near to the extremity, the lead tube obtained is crystalline and possesses little flexibility, but it only requires a relatively small pressure. If, on the contrary, the solidification takes place very far from the extremity a grain-closing effect similar to that of hammering is exerted on the solid metal up to its point of issue, which improves the quality of the tube obtained, but the greater the cooling, the greater is the pressure required. To select and regulate the most suitable point of solidification, the water circulation may be arranged so that it can take place in a number of compartments 48, 49, 50 . . . . . .

and the water may be passed through only one or more of these compartments according to requirements.

The bell 35 (sustained by the support 75) containing the die is open at bottom and immersed in the molten lead in the container 7. In order to fill the bell 35 with lead, the apparatus is tilted as above explained so that it occupies the position shown in Fig. 9. Then the orifice 74 at top is opened to enable the air in the bell 35 to be driven out. The bell being now full of lead, the orifice 74 is closed and the pump is put back into its normal position. The entire machine is mounted on the cast iron container 7 which forms a frame, and the container itself is fixed on a shell which forms the outer casing of the furnace for melting the lead. This brickwork furnace 37 (see Fig. 12 at a little scale) comprises a fire grate 33, a flue 38 for heating the lower part of the container and which divides into two lateral flues 39 where the flame returns, these lateral flues opening into the chimney 34. On the cast iron structure or casing are likewise fixed the cocks 31 for the admission and outlet of the water circulation to and from the casing 1, and the cocks 32 for the water circulation of the die. These cocks are connected to the water circulation by flexible tubes. Heat insulating coverings are provided at 75 and 76 around the cylinders of the regulator and the bell 35.

What I claim and desire to secure by Letters Patent is:—

1. In apparatus for shaping molten metal, a pump, said pump having a piston and cylinder adapted to be immersed in molten metal, said apparatus being pivotally mounted, and driving connections for said pump coaxial with the pivotal axis of the apparatus, said driving means being adapted to remain out of the molten metal, and said pump being movable into and out of immersion in the bath.

2. In apparatus for shaping molten metal, a pump, said pump having a substantially vertically arranged piston and cylinder adapted to be immersed in molten metal, means for continuously driving said pump, said driving means being adapted to remain out of the molten metal, and said pump being movable into and out of immersion in the bath.

3. In apparatus for shaping molten metal, a pump, said pump having a piston and cylinder adapted to be immersed in molten metal, and driving connections for said pump adapted to remain outside of said molten metal, said apparatus being rotatably mounted whereby it is movable into and out of immersion in the bath, said cylinders having plug outlets at the lower ends thereof, adapted to be opened for venting the cylinders.

4. In apparatus for shaping molten metal, a pump, said pump having a piston and cylinder adapted to be immersed in molten metal, a drive shaft, and driving connections between said shaft and piston, a casing rotatable on an axis concentric with said shaft, said casing having said cylinder mounted thereon and adapted to carry the same out of immersion when rotated.

5. A force pump for molten metal, comprising a plurality of pistons and cylinders, and driving means for said pistons, said cylinders being formed in a single block of metal, having a space between the cylinders, said cylinders being adapted to be immersed in the molten metal and to have the molten metal surround the same through said intermediate space in the block of metal, said driving connections being outside of the metal bath, and an oil jacket around said driving connections, and a water jacket around said oil jacket.

6. A force pump for molten metal, comprising a plurality of pistons and cylinders, and driving means for said pistons, said cylinders being formed of a block of metal having a space between, said cylinders being adapted to be immersed in the molten metal and to have the molten metal surround the same through said intermediate spaces, said driving connections being outside of the metal bath, and comprising a part adapted to detach itself from the pistons when a piston sticks, whereby the stuck piston will not offer a resistance to the operation of the operating piston.

7. A force pump for molten metal comprising a piston, a cylinder, and means for driving said piston, said cylinder being adapted to be immersed in the molten metal and said driving means being out of said metal, said driving means comprising a thrust plunger adapted to operate the piston in its force movement, a slide piston intermediate said piston and thrust plunger, and a spring adapted to operate said piston in its return movement.

8. A force pump for molten metal comprising a piston, a cylinder, and means for driving said piston, said cylinder being adapted to be immersed in the molten metal and said driving means being out of said metal, said driving means comprising a thrust plunger adapted to operate the piston in its force movement, a slide piston intermediate said piston and thrust plunger, and a ball between said slide-piston and piston, and a spring adapted to operate said piston in its return movement.

9. A force pump for molten metal comprising a piston, a cylinder, and means for driving said piston, said cylinder being adapted to be immersed in the molten metal and said driving means being out of said metal, said driving means comprising a thrust plunger having an eccentric or crank-engaging fork, said plunger being adapted to actuate said piston on its force stroke, and a spring for returning said piston.

10. A force pump for molten metal, comprising a plurality of pistons and cylinders, said cylinders being in communication with a common conduit, and a pressure regulator in communication with said common conduit, said pressure regulator serving as a safety valve and pressure gage, and comprising a cylinder having a safety vent therein, a rod within said cylinder, a pin on said rod adapted to close said safety vent, a spring pressing upon said rod, and means for regulating the tension of said spring.

11. A force pump for molten metal, comprising a plurality of pistons and cylinders, said cylinders being in communication with a common conduit, and a pressure regulator in communication with said common conduit, said pressure regulator serving as a safety valve and pressure gage, and comprising a cylinder having a safety vent therein, a rod within said cylinder, said rod being made in two parts with a ball between them, a pin on said rod adapted to close said safety vent, a spring pressing upon said rod, and means for regulating the tension of said spring.

In witness whereof, I have hereunto signed my name in the presence of two subscribing witnesses.

CHARLES PAUL BARY.

Witnesses:
BONI BARDY,
HANSON C. COXE.